US012145147B2

(12) United States Patent
Raj et al.

(10) Patent No.: US 12,145,147 B2
(45) Date of Patent: Nov. 19, 2024

(54) MICROFLUIDIC DEVICES AND METHOD OF MAKING SAME

(71) Applicant: Georgia Tech Research Corporation, Atlanta, GA (US)

(72) Inventors: Nikhil Raj, Atlanta, GA (US); Laurens Victor Breedveld, Atlanta, GA (US); Dennis W. Hess, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 804 days.

(21) Appl. No.: 16/970,999

(22) PCT Filed: Feb. 20, 2019

(86) PCT No.: PCT/US2019/018797
§ 371 (c)(1),
(2) Date: Aug. 19, 2020

(87) PCT Pub. No.: WO2019/164969
PCT Pub. Date: Aug. 29, 2019

(65) Prior Publication Data

US 2020/0376487 A1 Dec. 3, 2020

Related U.S. Application Data

(60) Provisional application No. 62/632,723, filed on Feb. 20, 2018.

(51) Int. Cl.
*B01L 3/00* (2006.01)

(52) U.S. Cl.
CPC ... *B01L 3/502707* (2013.01); *B01L 2300/126* (2013.01); *B01L 2300/161* (2013.01)

(58) Field of Classification Search
CPC ......... B01L 3/502707; B01L 2300/126; B01L 2300/161
See application file for complete search history.

(56) References Cited

U.S. PATENT DOCUMENTS

| | | | |
|---|---|---|---|
| 4,080,267 A | 3/1978 | Castellani et al. | |
| 8,790,594 B2 | 7/2014 | Hess et al. | |
| 9,594,056 B2 | 3/2017 | Fobel et al. | |
| 2004/0097077 A1 * | 5/2004 | Nallan | H01L 21/30655 438/689 |

(Continued)

FOREIGN PATENT DOCUMENTS

GB 2341924 3/2000

OTHER PUBLICATIONS

K1050x, accessed from https://www.fedelco.com/archivos/k1050x.pdf (Year: 2024).*

(Continued)

*Primary Examiner* — Matthew D Krcha
*Assistant Examiner* — Sophia Y Lyle
(74) *Attorney, Agent, or Firm* — Troutman Pepper Hamilton Sanders LLP; Ryan A. Schneider; Dustin B. Weeks

(57) ABSTRACT

Embodiments of the present disclosure relate generally to microfluidic devices and methods of making microfluidic devices. An exemplary method of making a microfluidic device comprises: providing a substrate; depositing, onto the substrate, a hydrophobic material; and etching, into the substrate, at least one hydrophilic channel into the hydrophobic substrate.

11 Claims, 7 Drawing Sheets

(56) References Cited

U.S. PATENT DOCUMENTS

| | | | | |
|---|---|---|---|---|
| 2006/0057209 | A1 | 3/2006 | Chapman et al. | |
| 2006/0185981 | A1 | 8/2006 | Turner et al. | |
| 2009/0011222 | A1 | 1/2009 | Xiu et al. | |
| 2011/0286896 | A1* | 11/2011 | Hess | B82Y 30/00 427/256 |
| 2011/0318227 | A1* | 12/2011 | Shen | F16K 99/0001 422/68.1 |
| 2012/0152895 | A1* | 6/2012 | Chebi | B81C 1/00619 216/37 |
| 2012/0181184 | A1 | 7/2012 | Whitesides et al. | |
| 2012/0198684 | A1 | 8/2012 | Carrilho et al. | |
| 2015/0107998 | A1* | 4/2015 | Fobel | B41M 5/0047 438/677 |

OTHER PUBLICATIONS

K1050X RF plasma Etcher/Asher/Cleaner accessed from https://web.archive.org/web/20170402093430/https://www.quorumtech.com/quorum-product/k1050x-plasma-etcherashercleaner (Year: 2017).*

Search Report from Application No. PCT/US2019/018797 dated May 9, 2019 (12 pages).

* cited by examiner

MICROFLUIDIC DEVICES AND METHOD OF MAKING SAME

CROSS-REFERENCE TO RELATED APPLICATIONS

This application claims priority to U.S. Provisional Patent Application No. 62/632,723, filed 20 Feb. 2018, which is hereby incorporated by reference herein in its entirety as if fully set forth below.

FIELD OF THE DISCLOSURE

Embodiments of the present disclosure relate generally to microfluidic devices and methods of making microfluidic devices.

BACKGROUND

Microfluidic paper-based analytical devices (μ-PAD) have shown considerable promise to meet the ASSURED criteria set by the World Health Organization for disease diagnostics in developing countries. Paper has been patterned using various fabrication methods such as photolithography, inkjet printing, laser cutting, and wax printing to allow distribution of liquid samples to targeted locations and perform subsequent reactions with reagents embedded in the paper. The results of these reaction can be seen visually by color or by determining the amount of analyte present in the sample. These μ-PADs are being used to detect species like glucose and for immunoassays. Detection of heavy metal contaminants such as lead and mercury has also been enabled through these devices. In addition, these devices have demonstrated utility in blood typing, whole blood separation, and blood coagulation screening. Low cost, portability, and absence of external power source requirements make these devices especially desirable for point-of-care diagnostics in less developed areas.

Although μ-PADs have clear advantages, they continue to face critical challenges that have hindered effective implementation. For example, the hydrophilic channels that are used to transport liquid are generally exposed to the environment which leads to a high risk of contamination, sample loss due to evaporation, and difficulty in device handling. One potential solution to these problems is to fabricate fully enclosed μ-PADs. Enclosed μ-PADs protect the sample from contamination and evaporation and increase the ease of device handling. Therefore, several attempts have been made to seal the faces of these microfluidic devices. However, the multi-step, multi-component processes that have been developed are complicated to implement, thereby inhibiting large scale manufacture of μ-PADs.

One example of a conventional approach to fabricate enclosed μ-PADs employs vinyl tape and polyester to sandwich a nitrocellulose membrane. Unfortunately, when using tape to seal devices, adhesive failure can occur when the channels are wetted, thus compromising reliability. Moreover, in these conventional systems, holes must be cut at the sample inlet, making tape alignment and pattern registration critical to ensure functional device fabrication. Such concerns and precision demands hinder the ability to implement these processes in large scale production. Furthermore, the tape adhesive can diffuse into the paper and contaminate the channels.

Another conventional approach employs inkjet printing to fabricate enclosed μ-PADs. In this approach, devices are generated by first applying a hydrophobic UV curable acrylate to both sides of the paper, followed by curing for 60 secs to form enclosed patterns. The advantage to this approach is that only one printer is required to produce devices and to load them with sensing reagents. However, ink-jet printing requires hardware modification and the solvents required to solubilize sensing reagents are volatile and control of the amount of printed reagent is difficult, which again limits that ability to realize large scale production.

Another conventional approach uses wax printing to form enclosed channels. For example, hemi-(half closed) and fully enclosed channels can be formed by carefully controlling the amount and infusion patterns of the printed wax into the paper substrate. Although this method is fast, it requires careful alignment of patterns on both sides of the paper.

Another conventional method is to use printer toner to seal the faces of hydrophilic zones after reagent deposition and drying. However, it has been found that the harsh conditions during the toner printing process destroy up to 90% of the reagent enzyme necessary for colorimetric reaction. Hence, this method will not be viable when high reagent activity is needed.

Considering the limitations and difficulties involved with current methods to fabricate enclosed μ-PADs, there exists a need for alternative approaches that can address some of the disadvantages associated with the conventional processes discussed above.

SUMMARY

Embodiments of the present disclosure address these concerns as well as other needs that will become apparent upon reading the description below in conjunction with the drawings. Briefly described, embodiments of the present disclosure relate generally to microfluidic devices and methods of making microfluidic devices.

An exemplary embodiment provides a method of making a microfluidic device. The method can comprise: providing a substrate; depositing, onto the substrate, a hydrophobic material; and etching, into the substrate, at least one hydrophilic channel into the hydrophobic substrate.

In any of the embodiments described herein, the hydrophobic material can be formed from a hydrophobic precursor gas.

In any of the embodiments described herein, the hydrophobic precursor gas can be a hydrophobic fluorocarbon or hydrophobic hydrocarbon.

In any of the embodiments described herein, the hydrophobic precursor gas can comprise pentafluoro ethane (PFE).

In any of the embodiments described herein, the substrate can comprise a top surface and a bottom surface.

In any of the embodiments described herein, the depositing can comprise depositing the hydrophobic material from the top surface of the substrate.

In any of the embodiments described herein, the method can further comprise diffusing the hydrophobic material through the substrate.

In any of the embodiments described herein, the depositing can result in a non-uniform concentration of the hydrophobic material along a vertical plane of the substrate.

In any of the embodiments described herein, the non-uniform concentration can comprise a higher concentration of the hydrophobic material proximate the top surface of the substrate and a lower concentration of the hydrophobic material proximate the bottom surface of the substrate.

In any of the embodiments described herein, the etching can be performed using a reactive vapor.

In any of the embodiments described herein, the reactive vapor can be plasma.

In any of the embodiments described herein, the plasma can be oxygen plasma.

In any of the embodiments described herein, the plasma can be selected such that the plasma is able to both react with the hydrophobic material and diffuse into the substrate.

In any of the embodiments described herein, the etching can further comprise exposing the top surface of the substrate to the reactive vapor.

In any of the embodiments described herein, the etching can further comprise: reacting the reactive vapor with the higher concentration of the hydrophobic material proximate the top surface of the substrate; diffusing the reactive vapor into the substrate; and reacting the reactive vapor with at least a portion of the hydrophobic material in the substrate between the top surface of the substrate and the bottom surface of the substrate.

In any of the embodiments described herein, the reactive vapor can be substantially depleted before reaching the bottom surface of the substrate.

In any of the embodiments described herein, the reacting the reactive vapor with at least a portion of the hydrophobic material in the substrate between the top surface of the substrate and the bottom surface of the substrate can create a hydrophilic channel into at least a portion of the substrate between the top surface of the substrate and the bottom surface of the substrate.

In any of the embodiments described herein, the etching can create a hydrophilic channel in the hydrophobic substrate by removing a portion of the hydrophobic substrate between a top surface and a bottom surface of the hydrophobic substrate.

In any of the embodiments described herein, the etching can create a hydrophilic channel in the hydrophobic substrate by removing a portion of the hydrophobic substrate between a top surface and a bottom surface of the hydrophobic substrate and either the top surface or the bottom surface of the hydrophobic substrate.

In any of the embodiments described herein, the etching can create a hydrophilic channel in the hydrophobic substrate by removing a portion of the hydrophobic substrate between a top surface and a bottom surface of the hydrophobic substrate, the top surface of the hydrophobic substrate, and the bottom surface of the hydrophobic substrate.

In any of the embodiments described herein, the method can further comprise masking, during the etching, the substrate with a mask to create a predefined pattern.

In any of the embodiments described herein, the mask can comprise a non-porous material.

In any of the embodiments described herein, the non-porous material can comprise a metal.

In any of the embodiments described herein, the substrate can comprise a porous material.

In any of the embodiments described herein, the porous material can comprise a woven or non-woven material.

In any of the embodiments described herein, the porous material can comprise a cellulosic material.

In any of the embodiments described herein, the cellulosic material can comprise cellulose chromatography paper.

Another embodiment provides a microfluid device. The device comprises: a layer of porous material; one or more hydrophilic channels in the layer of porous material, each channel having a channel-layer interface; and a hydrophobic material positioned at the channel-layer interfaces.

In any of the embodiments described herein, the device can comprise a single layer of porous material.

In any of the embodiments described herein, the device can comprise two or more layers of porous material, each layer of can have one or more hydrophilic channels in the respective layer of porous material, each channel can have a channel-layer interface, and each layer can have a hydrophobic material positioned at the channel-substrate interfaces.

In any of the embodiments described herein, the one or more hydrophilic channels can each comprise an interior volume.

In any of the embodiments described herein, the layer of porous material can comprise a top surface and a bottom surface.

In any of the embodiments described herein, the one or more hydrophilic channels can be horizontally disposed in the layer of porous material.

In any of the embodiments described herein, a bottom side of the one or more hydrophilic channels can be positioned above a bottom surface of the layer of porous material.

In any of the embodiments described herein, a top side of the one or more hydrophilic channels can be positioned beneath a top surface of the layer of porous material.

In any of the embodiments described herein, a top side of the one or more hydrophilic channels can be positioned beneath a top surface of the layer of porous material, and a bottom side of the one or more hydrophilic channels can be positioned above a bottom surface of the layer of porous material.

In any of the embodiments described herein, the device can further comprise one or more vertical hydrophilic channels disposed above the one or more horizontally-disposed hydrophilic channels.

In any of the embodiments described herein, the device can further comprise one or more vertical hydrophilic channels disposed beneath the one or more horizontally-disposed hydrophilic channels.

In any of the embodiments described herein, the one or more vertical hydrophilic channels can be in fluid communication with the one or more horizontally-disposed hydrophilic channels.

In any of the embodiments described herein, the one or more horizontally-disposed hydrophilic channels and the one or more vertical hydrophilic channels together can form a single interior volume.

In any of the embodiments described herein, the single interior volume can have a predetermined pattern.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE FIGURES

Reference will now be made to the accompanying figures and diagrams, which are not necessarily drawn to scale, and wherein.

DETAILED DESCRIPTION

Figure 1A:
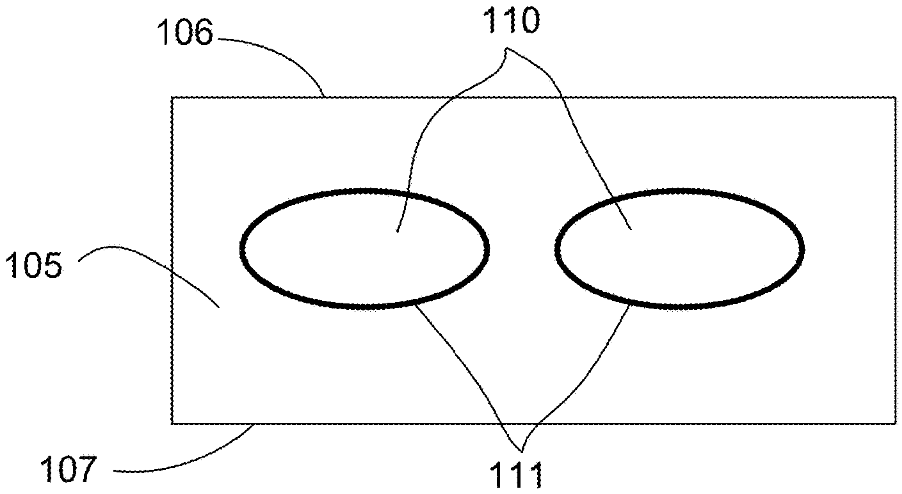
FIGS. 1A-1C depict cross-sectional views of schematics of microfluidic devices, according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

To facilitate an understanding of the principles and features of the disclosure, various illustrative embodiments are explained below. In particular, the presently disclosed subject matter is described in the context of microfluidic devices and methods of making the same. The present disclosure, however, is not so limited and can be applicable in other contexts.

Figure 1B:
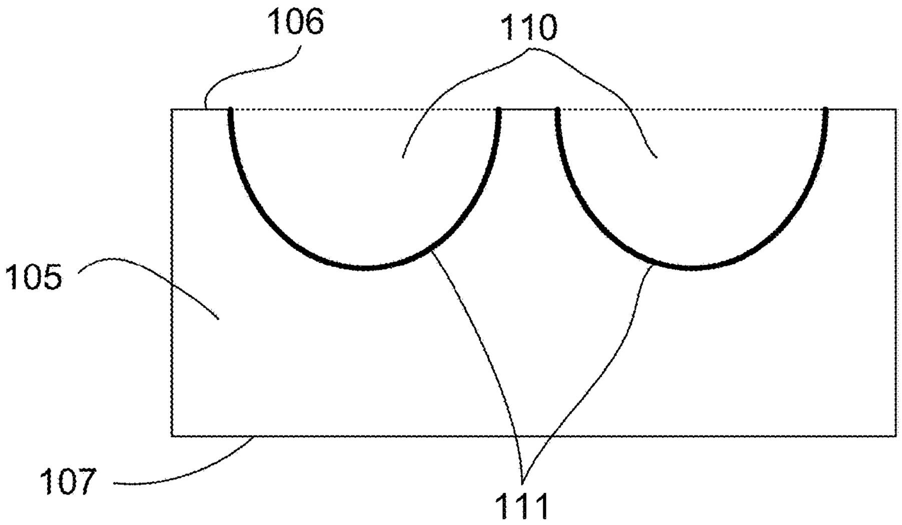
Figure 1C:
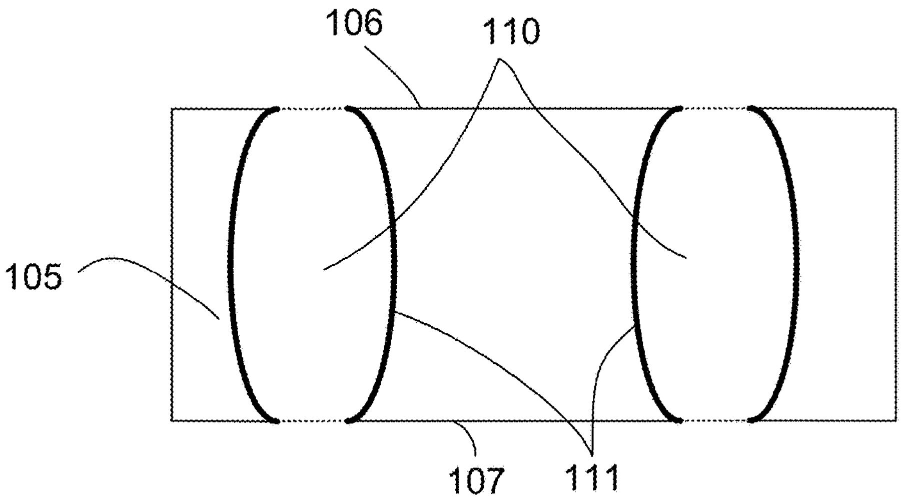
Figure 7:
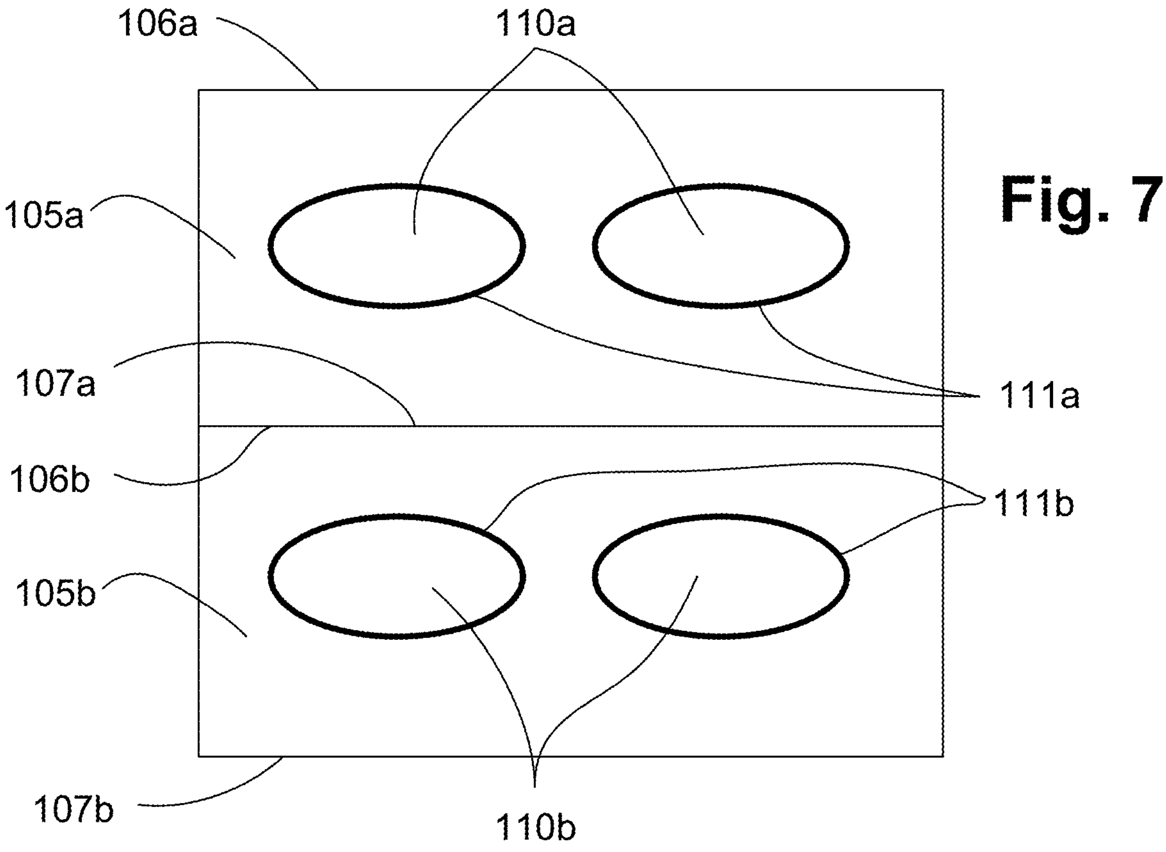
FIG. 7 depicts a cross-sectional view of a schematic of a microfluidic device, according to some embodiments of the present disclosure.

As shown in FIGS. 1A-1C, an exemplary provides a microfluid device. The device comprises: a layer of porous material 105; one or more hydrophilic channels 110 in the layer of porous material, each channel having a channel-layer interface 111; and a hydrophobic material positioned at the channel-layer interface. As shown in FIGS. 1A-1C, the microfluidic device can comprise a single layer of porous material 105. Alternatively, as shown in FIG. 7 and discussed below, the microfluidic device can comprise multiple layers of porous material 105*a-b*.

The layer 105 can be made of any porous material known in the art. For example, the porous material can be a woven or non-woven material. In an exemplary embodiment, the porous material can be a cellulosic material, such as a paper. In an exemplary embodiment, the porous material can be cellulose chromatography paper.

Figure 6:
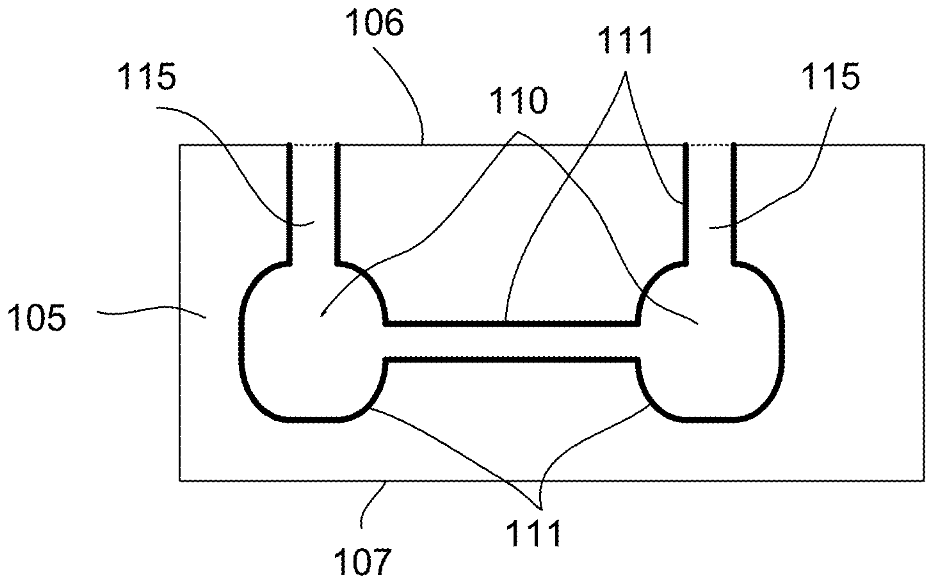
FIG. 6 depicts a cross-sectional view of a schematic of a microfluidic device, according to some embodiments of the present disclosure.

The hydrophilic channels can have an internal volume that is configured to hold a fluid. As shown in FIGS. 1A-1C, each hydrophilic channel 110 can have an internal volume isolated from other hydrophilic channels. Alternatively, as shown in FIG. 6, each hydrophilic channel 110 can be in fluid communication with another microfluidic channel 110 such that the hydrophilic channels 110 define a single internal volume.

In any of the embodiments described herein, the layer of porous material 105 can comprise a top surface 106 and a bottom surface 107. As shown in FIGS. 1A-1C, which provide a cross section of a microfluidic device, the hydrophilic channels 110 can be horizontally-disposed in the layer of porous material 105. As shown in FIG. 1A-1B, a bottom side of the one or more hydrophilic channels 110 can be positioned above a bottom surface 107 of the layer of porous material. As shown in FIG. 1A, a top side of the one or more hydrophilic channels 110 can be positioned beneath a top surface 106 of the layer of porous material. As shown in FIG. 1A, a top side of the one or more hydrophilic channels 110 can be positioned beneath a top surface 106 of the layer of porous material 105, and a bottom side of the one or more hydrophilic channels 110 can be positioned above a bottom surface 107 of the layer of porous material 105. As shown in FIG. 1C, no portion of the layer of porous material 105 is positioned either above the top side of the hydrophilic channel 110 or beneath the bottom side of the hydrophilic channel 110. As shown in FIG. 1B, a portion of the layer of porous material 105 can be positioned beneath the bottom side of the hydrophilic channel 110 and no portion of the layer of porous material 105 can be positioned above the top side of the hydrophilic channel. Although not shown, it is also contemplated that the hydrophilic channel be disposed such that a portion of the layer of porous material is positioned above the top side of the hydrophilic channel but no portion of the layer of porous material is positioned beneath the bottom side of the hydrophilic channel.

As will be described in more detail below, the fluid can be held in the hydrophilic channel, i.e., not permitted to soak into the layer of porous material, because of a hydrophobic material located at the channel-layer interface, i.e., where the hydrophilic channel meets the layer of porous material. The hydrophobic material can be many hydrophobic materials known in the art. For example, the hydrophobic material can be formed from a hydrophobic precursor gas. The hydrophobic precursor gas can be a hydrophobic fluorocarbon or hydrophobic hydrocarbon. In an exemplary embodiment, the hydrophobic precursor gas can be pentafluoro ethane (PFE).

As shown in FIG. 7, which shows a cross-sectional view of an exemplary microfluidic device, some embodiments include multiple layers of porous material 105*a-b*, which can form a stack. Each layer can have one or more hydrophilic channels 110*a-b* in the respective layers 105*a-b*. Each layer can have a channel-layer interface 111*a-b*, and a hydrophobic material can be positioned at the channel-layer interface 111. The hydrophilic channels 110*a-b* can be disposed in the layers of porous material 105*a-b* in many different configurations. For example, as shown in FIG. 7, the hydrophilic channels 110*a-b* are disposed between the respective top surfaces 106*a-b* and bottom surfaces 107*a-b* of the layers 105*a-b*. However, the channels 110*a-b* in each layer can be disposed in many different configurations, such as those shown in FIGS. 1A-1C.

As shown in FIG. 6, which is a cross-sectional view of an exemplary microfluidic device, the device can further comprise one or more vertical hydrophilic channels 115. The vertical hydrophilic channels 115 can be disposed either above the one or more horizontally-disposed hydrophilic channels 110 (as shown in FIG. 6) or beneath the one or more horizontally-disposed hydrophilic channels 110 (not shown). Additionally, in some embodiments, the microfluidic device can include vertical hydrophilic channels 115 above the horizontally-disposed hydrophilic channels 110 and vertical hydrophilic channels beneath the horizontally-disposed hydrophilic channels 110. The vertical hydrophilic channels can provide fluid communication between an exterior of the microfluidic device to the horizontally-disposed hydrophilic channels 110. As shown in FIG. 6, the one or more horizontally-disposed hydrophilic channels and the one or more vertical hydrophilic channels together can form a single interior volume. The single interior volume can have a predetermined pattern.

Figure 5:
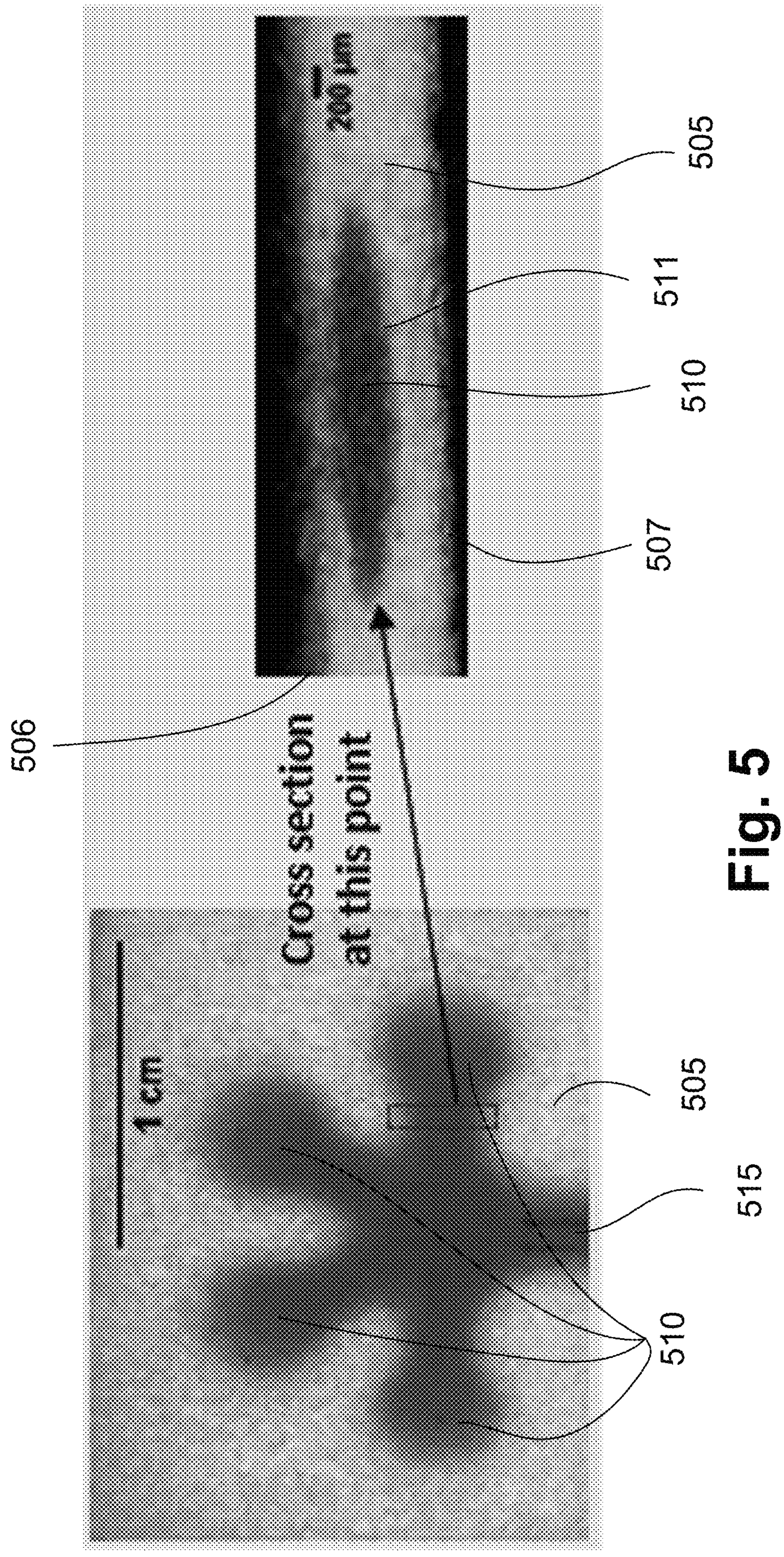

For example, FIG. 5 provides a photograph of both a top view (left side of FIG. 5) and a cross-sectional view (right side of FIG. 5) of an exemplary microfluidic device. The device includes a layer of porous material 505 and a plurality of hydrophilic channels 510. As shown from the top view, the plurality of hydrophilic channels 510 together form a single interior volume.

Various embodiments also provide methods of making the various microfluidic devices described above. An exemplary embodiment provides a method comprising: providing a substrate; depositing, onto the substrate, a hydrophobic material; and etching, into the substrate, at least one hydrophilic channel into the hydrophobic substrate.

As discussed above, the substrate, which ultimately results in the layer of porous material discussed above, can be formed from many different porous materials, including, but not limited to, woven materials, non-woven materials, and cellulosic materials, such a paper. In an exemplary embodiment the substrate is cellulose chromatography paper.

A hydrophobic material can be deposited on the top surface of the substrate, and because the substrate can be porous, the hydrophobic material can diffuse into the substrate. The hydrophobic material can be many different hydrophobic materials known in the art. In some embodiments, the hydrophobic material can be formed from a hydrophobic precursor gas. The hydrophobic precursor gas can be a hydrophobic fluorocarbon or hydrophobic hydrocarbon, such as pentafluoro ethane (PFE).

After depositing the hydrophobic material on the top surface of the substrate and allowing it to diffuse into the substrate, a non-uniform concentration of the hydrophobic material can be present along the vertical plane of the substrate. In other words, a higher concentration of the hydrophobic material can be present at the top surface of the substrate, and the concentration of the hydrophobic material can decrease as you move towards the lower surface of the substrate.

The substrate can then be etched to create one or more hydrophilic channels. The etching can be performed using any reactive vapor. In an embodiment, the etching is performed using a plasma, such as oxygen plasma. The reactive vapor, e.g., plasma, can be selected such that it is able to both react with the hydrophobic material and diffuse into the substrate.

During the etching process, the top surface of the substrate can be exposed to the reactive vapor. Upon exposure to the top surface of the substrate, the reactive vapor can react with the higher concentration of hydrophobic material proximate the top surface of the substrate. The reactive vapor can then diffuse into the substrate where it reacts with the portion of the substrate having lower concentrations of the hydrophobic material, e.g., those portions between the top and bottom surfaces of the substrate. As the reactive vapor diffuses from the top surface of the substrate towards the bottom surface of the substrate, the reactive vapor can be substantially depleted prior to reaching the bottom surface of the substrate.

Figure 3A:
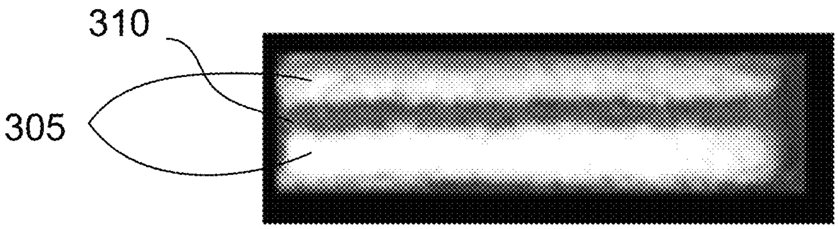
FIGS. 3A-3E provide photographs of cross-sectional views of microfluidic devices, according to some embodiments of the present disclosure.
Figure 3B:
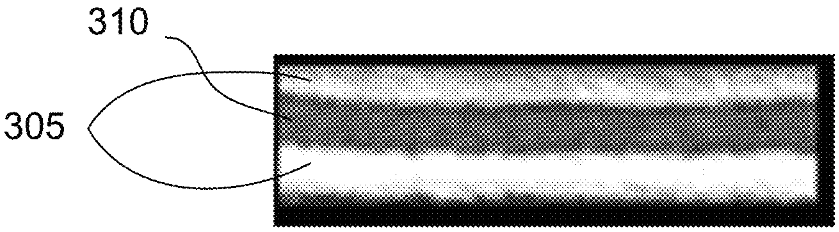
Figure 3C:
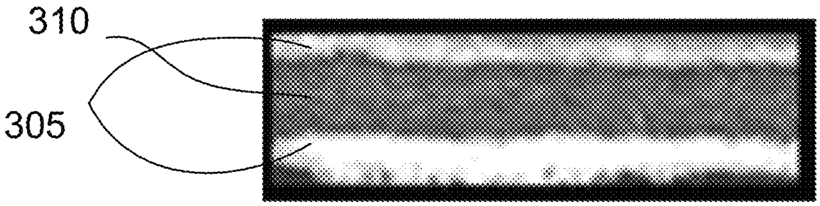
Figure 3D:
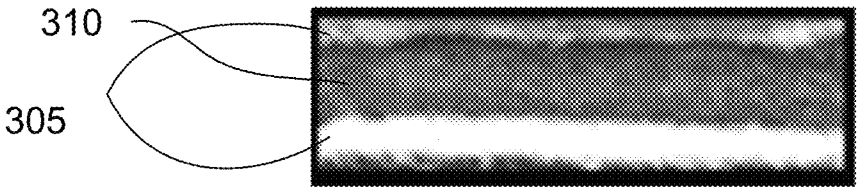
Figure 3E:
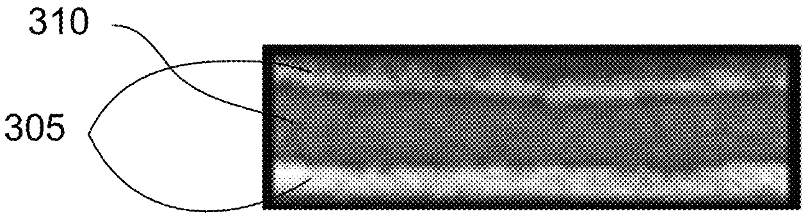

The configuration of the resulting hydrophilic channels in the substrate depend on the etching parameters, e.g., the length of time of etching. Because of the non-uniform concentration of the hydrophobic material, i.e., greater at the top surface of the substrate than in the middle of the substrate, and because the reactive vapor is first exposed to the top surface of the substrate and then diffuses into the substrate, the etching step can create a hydrophilic channel, first, in a center portion of the substrate between the top surface of the substrate and the bottom surface of the substrate. This can occur because the etching can remove a portion of the hydrophobic substrate between the top surface and bottom surface of the hydrophobic substrate. Depending on, for example, the length of time of the etching step, the size of the hydrophilic channel can change. FIGS. 3A-3E, which provide photographs of cross-sectional views of exemplary microfluidic devices, illustrate how the size of the channel can change depending on the length of time of the etching: FIG. 3A shows a channel resulting from a 40 s etch time; FIG. 3B shows a channel resulting from a 50 s etch time; FIG. 3C shows a channel resulting from a 60 s etch time; FIG. 3D shows a channel resulting from a 70 s etch time; and FIG. 3E shows a channel resulting from a 80 s etch time.

In addition to removing portions of the hydrophobic substrate between the top and bottom surfaces of the substrate, the etching process can also remove the top and/or bottom surfaces of the substrate to create hydrophobic channel configurations, such as those shown in FIGS. 1B-C. For example, the etching can create a hydrophilic channel in the hydrophobic substrate by removing a portion of the hydrophobic substrate between a top surface and a bottom surface of the hydrophobic substrate and either the top surface (as shown in FIG. 1B) or the bottom surface of the hydrophobic substrate (not shown). Alternatively, the etching can create a hydrophilic channel in the hydrophobic substrate by removing a portion of the hydrophobic substrate between a top surface and a bottom surface of the hydrophobic substrate, the top surface of the hydrophobic substrate, and the bottom surface of the hydrophobic substrate, as shown in FIG. 1C.

The various methods of making a microfluidic device disclosed herein can also include masking, during the etching, the substrate with a mask to create a predefined pattern of the hydrophilic channels. The mask can comprise many different non-porous materials, such as metals.

Figures 2A, 2B, 2C:
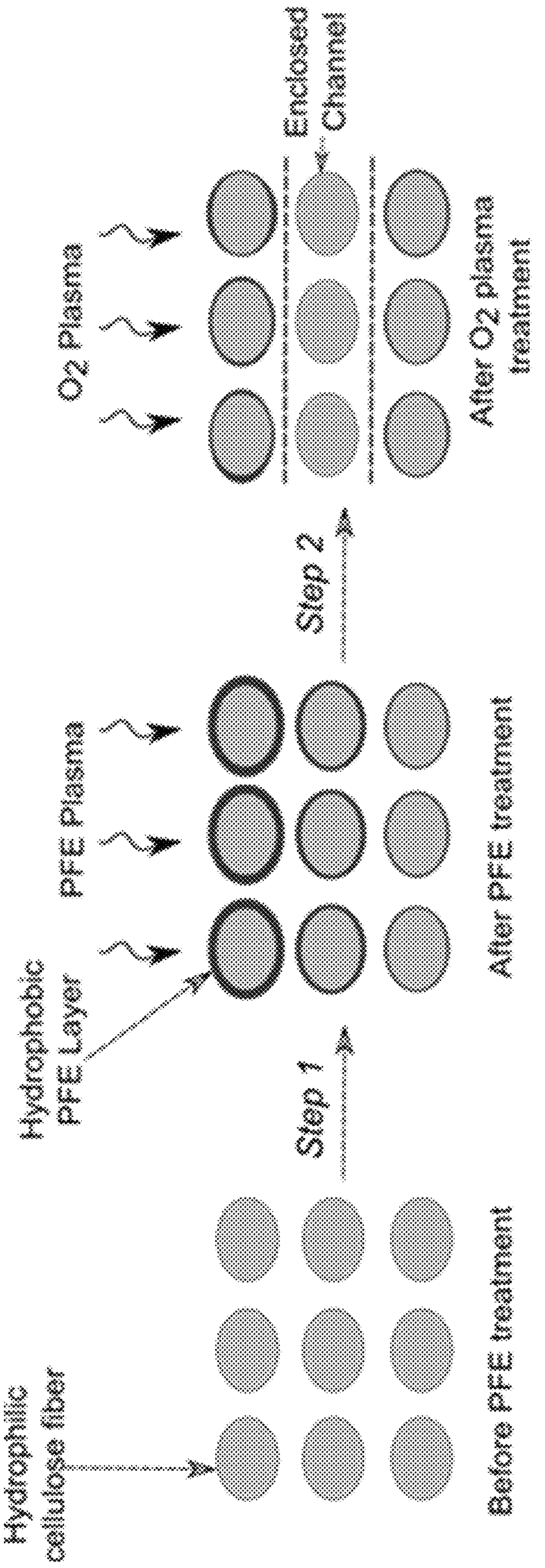
FIGS. 2A-2C illustrate a method of making a microfluidic device, according to some embodiments of the present disclosure.

FIGS. 2A-2C illustrate an exemplary method of making a microfluidic device. As shown in the figures, the method begins with a hydrophilic cellulose substrate (FIG. 2A). A hydrophobic material, such as PFE, is then deposited on the top surface of the substrate and permitted to diffuse into the substrate (FIG. 2B). The top surface of the substrate is then exposed to a reactive vapor, such as oxygen plasma. The reactive vapor reacts with the hydrophobic material to remove a portion of the hydrophobic material to create a hydrophilic channel in the substrate (FIG. 2C).

Example

An example of the method of making a microfluidic device will now be described.

Whatman Cellulose chromatography paper (Grade 17 chr, thickness 0.92 mm was used as a substrate. A 13.56 MHz, 6-inch parallel plate plasma reactor was used to deposit fluorocarbon films (pentafluoro ethane monomer) and to perform oxygen plasma etching. Brilliant Blue G dye was purchased from Sigma Aldrich and was added to the water to enhance contrast when determining the hydrophilic regions of the paper and for visualizing fluid flow. A CCD camera with high-magnification zoom lens (Leica Z6 APO) was used to take cross sectional images of the paper.

Fabrication Process: The paper was treated by a two-step process: 1) fluorocarbon deposition, followed by 2) $O_2$ plasma etching. The paper substrate was placed inside the reactor, which was evacuated to a base pressure of 0.008 tor. Paper was weighed down with a metal ring to prevent sample movement and to inhibit the direct deposition/etching of the back side of the paper by plasma. This is to make sure that the primary source of plasma species enters the bulk of the paper through the top surface of the paper via diffusion. The etching/deposition was then carried out according to the working parameters of the plasma reactor as shown in the table below. For the given reaction conditions, fluorocarbon deposition results in around 10 μm thick fluorocarbon film on the silicon wafer. When creating patterns, the oxygen plasma step was performed with a metal mask on top of the paper. After the two-step process, the treated paper was dipped into aqueous dye solution resulting in coloring of hydrophilic part of the paper. The resulting colored paper pattern was then cut using a razor blade so that the cross-section of the substrate could be imaged; resulting images were analyzed with Image J software.

| Parameters | Etching | Deposition |
| --- | --- | --- |
| Gas | $O_2$ + Ar | PFE + Ar |
| Flowrate | 7 + 80 sccm | 20 + 75 sccm |
| Temperature | 35° C. | 110° C. |
| Pressure | 0.4 torr | 1.29 torr |
| Power | 20 W | 120 W |
| Reaction time | 30-90 secs | 4 mins |

FIGS. 2A-2C show a schematic of the two-step deposition and etching process that creates the enclosed channels. In step 1, paper is subjected to PFE plasma treatment leading to non-uniform deposition of fluorocarbon film on the fiber surface as a function of paper depth (thicker at the top and thinner at the bottom). In step 2, the paper is exposed to an $O_2$ plasma from the same side. The active free radical oxygen species diffuse through the porous paper substrate and react with the fluorocarbon film. The $O_2$ plasma exposure time was chosen such that the active species were able to diffuse inside the paper and etch away the relatively thin fluorocarbon film at the center of the paper while only partially etching the thick film at the top part of the paper leading to hydrophobic top and hydrophilic center regions in the paper. Furthermore, prior to reaching the bottom of the paper, the active free radical oxygen species reacted or recombined during the diffusion process. At the end of the etching process the fibers at the bottom part of the paper are therefore still covered with a thin PFE film, resulting in enclosed channel.

FIGS. 3A-3E show cross-sections of the paper after deposition of a thin fluorocarbon layer (step 1), that have been exposed to different $O_2$ etch times (step 2). Variation of the oxygen plasma etch time allows creation of enclosed channels with different widths. The channel thickness were reproducible (sample to sample variation $\sigma_{avg}$=35 μm) and uniform across the paper (within sample variation σ=34.5 μm). Although there appears to be a sharp transition between hydrophobic and hydrophilic regions, it is believed that a continuous wettability gradient may exist near the channel-substrate interfaces due to incomplete $O_2$ plasma etching of the fluorocarbon layer. As a result of this gradient, thinner channels wick liquid slower than thicker channels. This device property can be adjusted when the velocity of sample (liquid) flow is critical.

Figure 4A:
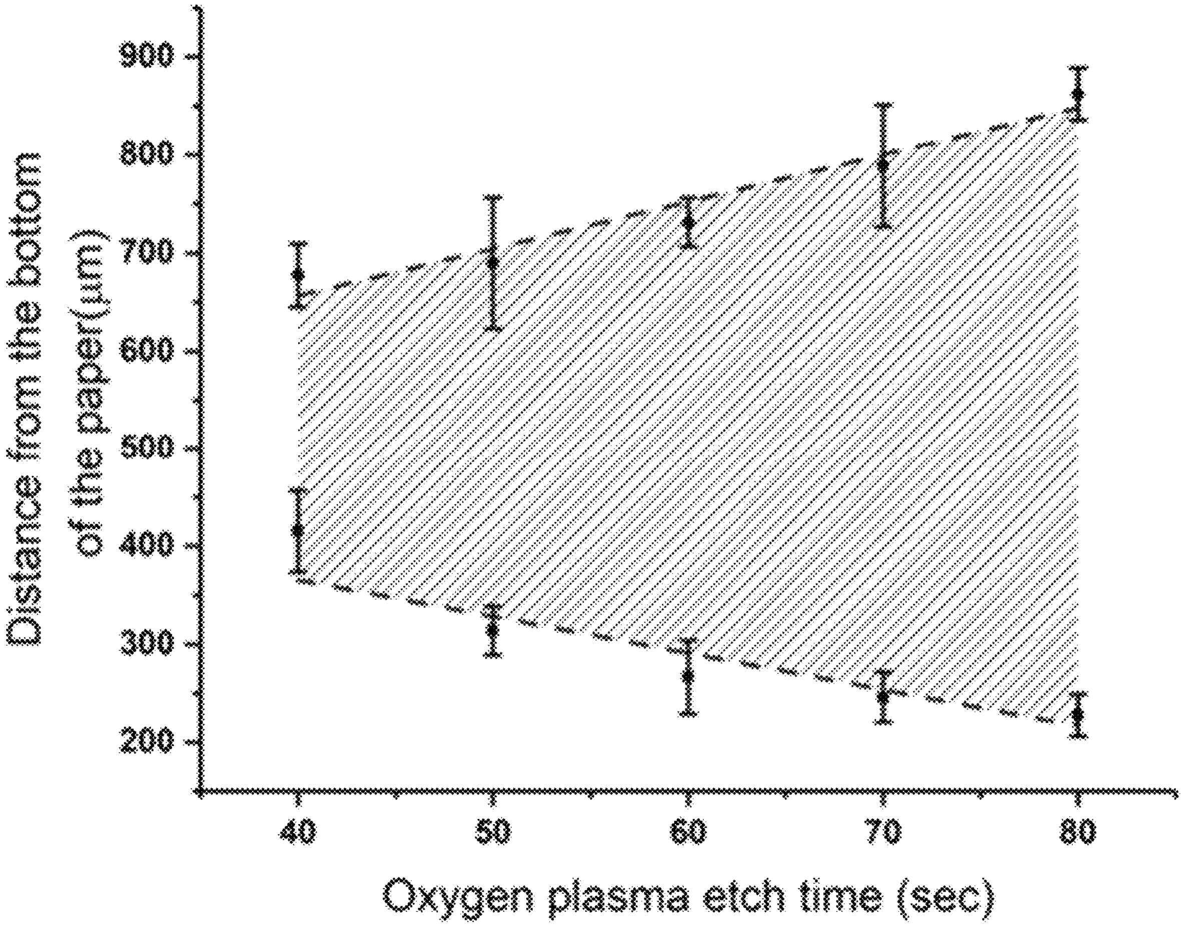
FIGS. 4A-4B provide graphical plots of channel thickness as a result of etch time, according to some embodiments of the present disclosure FIG. 5 provides photographs of a top view (left) and cross-sectional view (right) of a microfluidic device, according to some embodiments of the present disclosure.
Figure 4B:
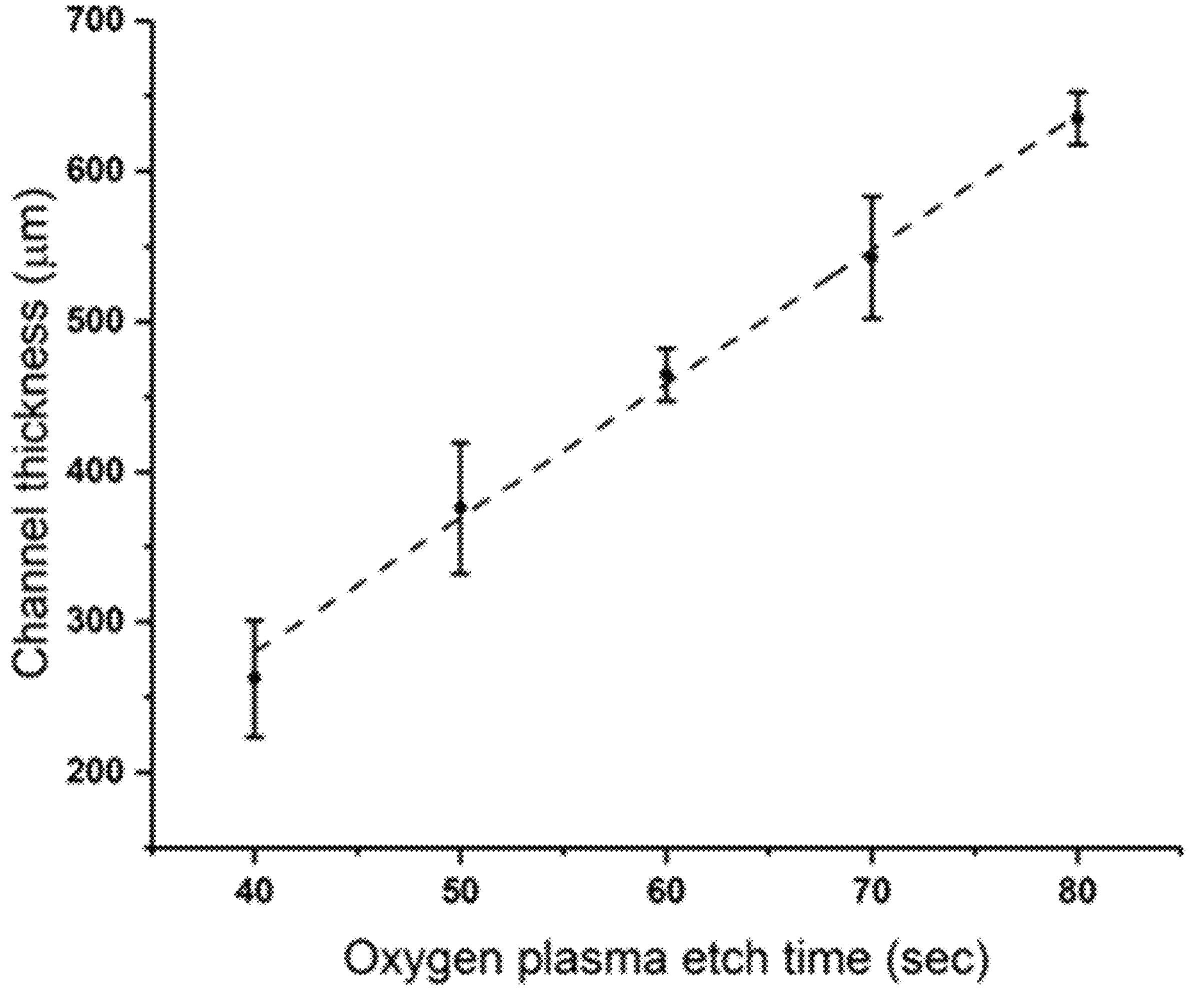

The images in FIGS. 3A-3E were analyzed using Image J software to quantify the effects of $O_2$ plasma on paper wetting in the z-direction. The results are shown in FIGS. 4A-4B. In FIG. 4A, the bottom line represents the demarcation or interface between the lower hydrophobic region and the hydrophilic channel, while the upper line represents the demarcation or interface between the top of the hydrophilic channel and top hydrophobic region. The distance between the top line and the bottom line in FIG. 4A, therefore, gives a measure of the channel thickness (FIG. 4B).

Oxygen plasma etching was performed using a metal mask to protect the fluorocarbon layers beneath the mask from etching in areas where it was desired to retain hydrophobicity throughout the paper. This process generated the enclosed hydrophilic pattern shown in FIG. 5. The hydrophilic part was stained with aqueous dye solution and the translucent paper was illuminated from the bottom to clearly identify the wetted region inside the paper. Because the pattern is near the top surface of the paper, the dye color is clearly visible; this device is therefore well-suited for performing colorimetric assays.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method of making a microfluidic device comprising:

non-uniformly depositing a concentration of hydrophobic material into a single layer of a cellulosic material with a thickness defined between a top surface and a bottom surface, wherein the hydrophobic material is a fluorocarbon film, wherein a thickness of the deposited fluorocarbon film is a function of the thickness of the cellulosic material such that the fluorocarbon film is thicker proximate the top surface, while the thickness of the fluorocarbon film lessens the more distal the top surface; and applying an oxygen plasma for an etching reaction time to a selective area of the cellulosic material such that an active free radical species diffuses inside the cellulosic material and etches fully enclosed hydrophilic channels in the thickness of the cellulosic material while only partially etching the thicker fluorocarbon film proximate the top surface of the cellulosic material, providing the microfluidic device with a hydrophobic top surface and the fully enclosed hydrophilic channels;

wherein the active free radical species is substantially depleted before reaching the bottom surface of the cellulosic material.

2. The method of claim 1, wherein the depositing is for a depositing reaction time of approximately four minutes; and wherein the etching reaction time is from about thirty to sixty seconds.

3. The method of claim 1, wherein at least one of the at least one fully enclosed hydrophilic channels is selected from the group consisting of a flow channel for sample flow, an inlet for dispensing a liquid sample, and a combination thereof.

4. The method of claim 1 further comprising masking, during the applying, the cellulosic material with a mask to define the selective area of the cellulosic material.

5. The method of claim 1, wherein the cellulosic material is paper.

6. The method of claim 1, wherein the cellulosic material is cellulose chromatography paper.

7. The method of claim 1 further comprising forming the hydrophobic material from a hydrophobic precursor gas.

8. The method of claim 1, wherein the hydrophobic material is formed from pentafluoro ethane (PFE).

9. The method of claim 1, wherein the depositing uses pentafluoro ethane (PFE) and argon as precursor gases.

10. The method of claim 1, wherein the cellulosic material is a porous cellulosic material; and the non-uniformly depositing comprises subjecting the single layer of the porous cellulosic material to a unidirectional pentafluoro ethane (PFE) plasma treatment for a subjecting reaction time.

11. The method of claim 1, wherein the non-uniformly depositing comprises:

placing the cellulosic material in a plasma reactor;

evacuating the plasma reactor to a base pressure; and depositing the hydrophobic material with the plasma reactor for a depositing reaction time.

* * * * *